United States Patent
Doctor et al.

(10) Patent No.: US 9,503,481 B2
(45) Date of Patent: *Nov. 22, 2016

(54) SYSTEM AND METHOD FOR A SECURITY ASSET MANAGER

(71) Applicant: Level 3 Communications, LLC, Broomfield, CO (US)

(72) Inventors: Brad Bernay Doctor, Golden, CO (US); Taylor Fraley, Erie, CO (US); Daniel Joseph Romero, Westminster, CO (US); Brett Wentworth, Broomfield, CO (US); Keshava Berg, Lafayette, CO (US)

(73) Assignee: LEVEL 3 COMMUNICATIONS, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/942,818

(22) Filed: Nov. 16, 2015

(65) Prior Publication Data

US 2016/0072846 A1 Mar. 10, 2016

Related U.S. Application Data

(63) Continuation of application No. 14/089,285, filed on Nov. 25, 2013, now Pat. No. 9,191,409.

(51) Int. Cl.
*H04L 29/06* (2006.01)
(52) U.S. Cl.
CPC ............ *H04L 63/20* (2013.01); *H04L 63/105* (2013.01); *H04L 63/1433* (2013.01)

(58) Field of Classification Search
CPC ...... G06F 21/56; G06F 21/577; G06F 21/55; H04L 63/20
See application file for complete search history.

(56) References Cited

U.S. PATENT DOCUMENTS

| | | | |
|---|---|---|---|
| 7,451,488 B2 | 11/2008 | Cooper et al. | |
| 8,245,294 B1 | 8/2012 | Zahra et al. | |
| 2005/0154733 A1* | 7/2005 | Meltzer | ............... H04L 63/1416 |
| 2011/0119742 A1 | 5/2011 | Maguire | |
| 2012/0144493 A1 | 6/2012 | Cole et al. | |

OTHER PUBLICATIONS

International Search Report, dated Mar. 4, 2015, Int'l Appl. No. PCT/US14/067469, Int'l Filing Date Nov. 25, 2014; 3 pgs.
Written Opinion of the International Searching Authority, dated Mar. 4, 2015, Int'l Appl. No. PCT/US14/067469, Int'l Filing Date Nov. 25, 2014; 6 pgs.
International Preliminary Report on Patentability, dated May 31, 2016, Int'l Appl. No. PCT/US14/67469, Int'l Filing Date Nov. 25, 2014; 8 pgs.

* cited by examiner

*Primary Examiner* — Izunna Okeke

(57) ABSTRACT

Implementations of the present disclosure involve a system and/or method of performing security asset management. The system and/or method may schedule vulnerability scanners to scan the various portions of one or more networks and obtain the results of the vulnerability scans. IP addresses may be assigned to each of vulnerability scanners to scan. The system obtains the results of the vulnerability scans and may adjust the results of the scans according to configuration of the one or more networks that an IP address is associated with. The system and/or method may also assign and reassign IP addresses amongst the scanners to optimize scanning speed.

18 Claims, 5 Drawing Sheets

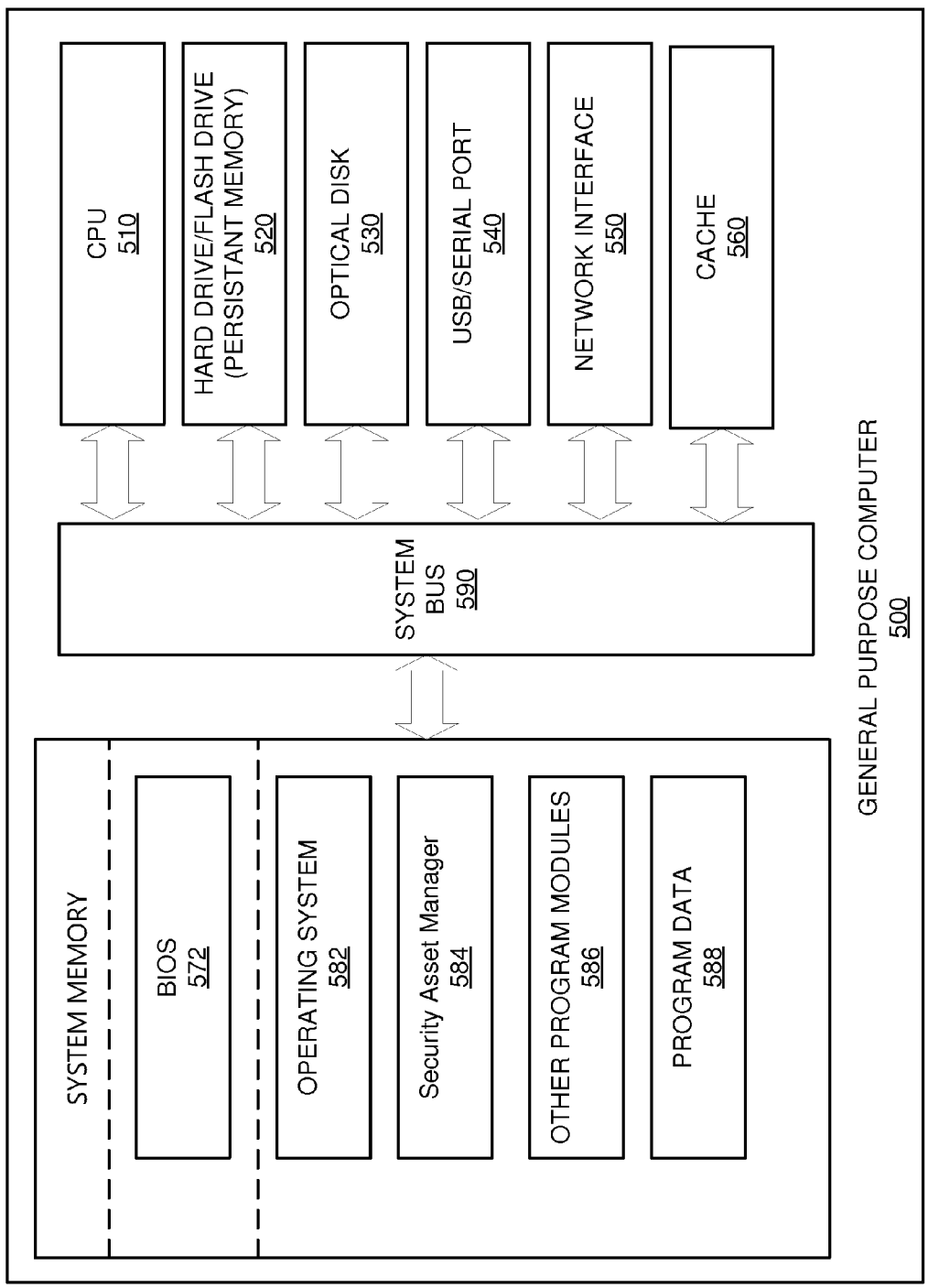

SYSTEM AND METHOD FOR A SECURITY ASSET MANAGER

This application is a continuation of U.S. patent application Ser. No. 14/089,285, filed Nov. 25, 2013, now U.S. Pat. No. 9,191,409, which is incorporated by reference in its entirety.

FIELD OF THE DISCLOSURE

Aspects of the present disclosure relate to a system and method for analyzing the security vulnerabilities of a plurality of devices operating on a network.

BACKGROUND

Telecommunications networks include a variety of computing devices including servers, personal computers, routers, and switches. As the number and types of devices on these networks has increased, so have the chances of one of the devices becoming compromised. This is especially true in the modern workplace where it has become increasingly common for employees to bring their own devices (laptops, tablets, and smart phones) to work and access a corporate network.

Network and information technology (IT) administrators are tasked with ensuring that a local network, such as the corporate network, is protected against outside attacks originating from the Internet as well as from viruses, worms, and trojan horses that might be inadvertently introduced to the corporate network when employees connect to the corporate network using their personal devices. A key part of maintaining a secure network involves ensuring that each computing device on the network is running up-to-date software and is also using appropriate settings. Due to the nature of modern networks and the various devices operating on the networks, maintaining a secure network involves working with a large variety of hardware configurations, various operating systems, and countless software applications.

In order to assist with network security, vulnerability scanners have been developed to assess the weaknesses of computing devices and applications operating on a given computing device by performing a variety of scans and operations. Nessus® is one particular example of a vulnerability scanner that scans for vulnerabilities that could allow a hacker to nefariously gain control of computers or access data. For example, Nessus® conducts port scans to determine which ports on a computing device are open to outside networks, and then attempts to exploit the open ports. Nessus® also scans for misconfigurations, outdated software, the use of default usernames/passwords, the use of common passwords (e.g. "password," "abc123," etc.), and for accounts with no passwords. Nessus® can also simulate attacks on a system like buffer overflows and denial of service (DOS). What Nessus® and similar products lack is the ability to look beyond individual machines and factor in network configuration.

It is with these and other issues in mind that various aspects of the present disclosure were developed.

SUMMARY

According to one aspect, a system and method is provided for a security asset manager (SAM) capable of managing security assets capable of performing security vulnerability scans on all or a portion of computing devices associated with Internet Protocol addresses (IP address) participating on a network. The SAM determines the vulnerabilities associated with each IP address, determines the risks posed by the vulnerabilities on both a device and a network scale, and makes recommendations to minimize the vulnerably of the network.

The security asset management system includes a computing device that directs a first vulnerability scanner or scanners to perform vulnerability scans on devices operating on first network. The computing is also configured to direct a second vulnerability scanner or scanners to perform vulnerability scans on devices operating on second network. The security asset management system provides each of the scanners with a list of IP addresses to scan. The scanners perform the scans and identify any vulnerabilities on the devices operating at the IP addresses. Vulnerabilities that are detected each assigned a severity rating. The security asset management system then adjusts the severity ratings based on the configuration of the network that the device with the vulnerability is operating on.

When using more than one vulnerability scanner to scan a network, the security management system may distribute IP addresses for scanning amongst the scanners. As scanning progresses, the system may monitor the progress of the scans and may reassign IP address based on the progress of each scanner.

The security asset management system may also discover any new devices that become connected to the network. New devices may be discovered by pinging previously unused IP address and receiving a response. When a new device is found, the new device is scanned for vulnerabilities and an entry for the device, including the results from the vulnerability scan, is added to a device inventory.

BRIEF DESCRIPTION OF THE DRAWINGS

Aspects of the present disclosure may be better understood and its numerous objects, features, and advantages made apparent to those skilled in the art by referencing the accompanying drawings. It should be understood that these drawings depict only typical embodiments of the present disclosure and, therefore, are not to be considered limiting in scope.

FIG. 5 is a block diagram illustrating an example of a general purpose computing system that may be used in the application of the present disclosure.

DETAILED DESCRIPTION

Implementations of the present disclosure involve a system and method for a security asset manager (SAM). The SAM provides a vulnerability management tool that identifies network security vulnerabilities that are exploitable by hackers or other bad actors. The SAM includes an interface for configuring and deploying one or more vulnerability scanners that scan devices for potential security issues. The SAM aggregates the results from the vulnerability scanners and processes the aggregated data to determine the severity of any vulnerability. The SAM may also be responsible for downloading and installing any available updates and installing new plugins on the vulnerability scanners to ensure the vulnerability scanners are up-to-date. The SAM also provides an interface for a user to remotely access the system. The SAM may also compile and maintain a listing of devices that are or have been connected to the network.

Figure 1:
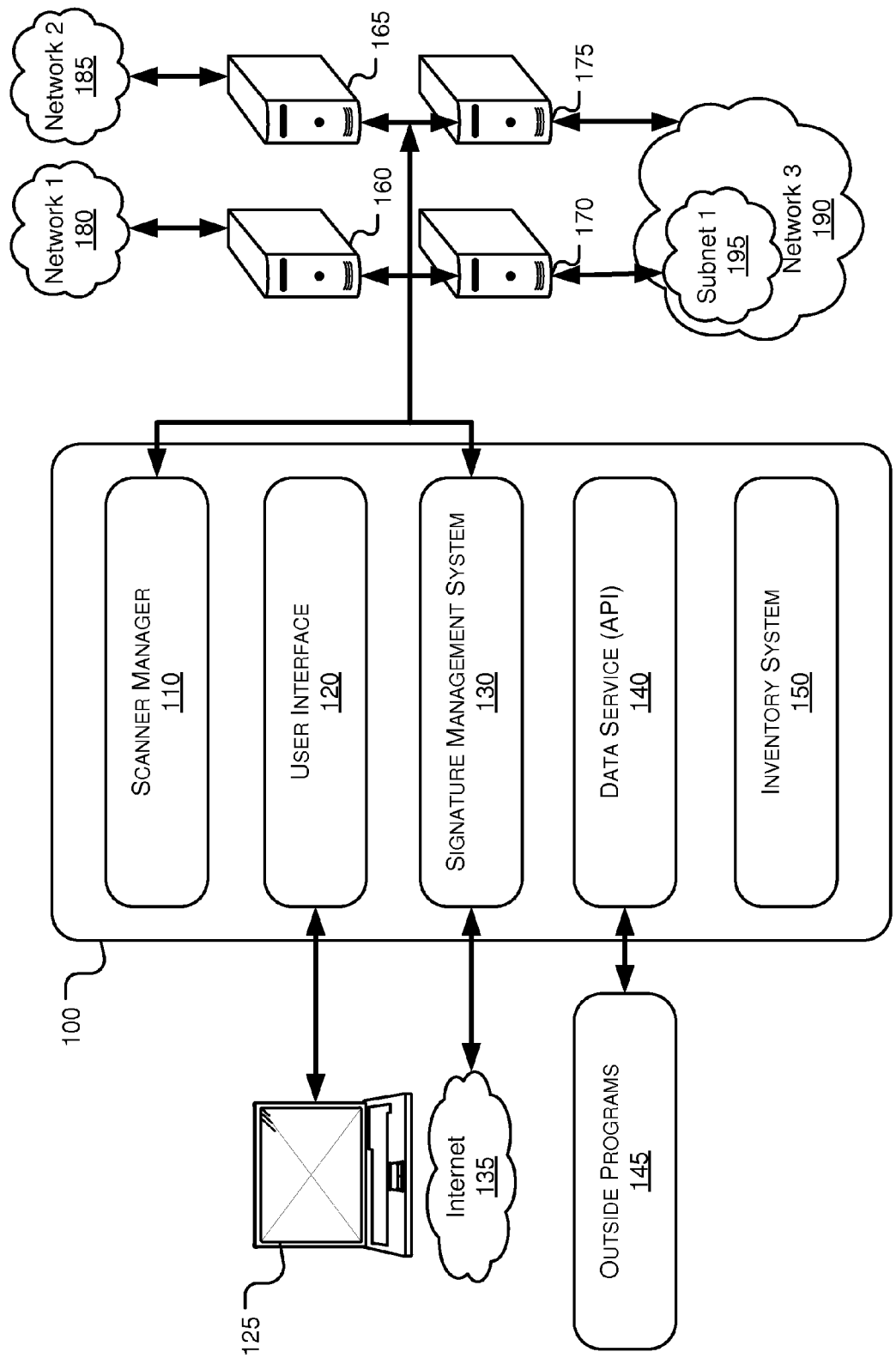
FIG. 1 depicts an example of a security asset manager configured to manage a plurality of network scanners configured to scan a network.

Referring to FIG. 1, the SAM 100 includes a scanner manager 110 for communicating instructions to vulnerability scanners and receiving results, a user interface 120 for setting the parameters of the system and viewing results, a data service 130 for allowing outside programs to communicate with the SAM 100 using an application programming interface (API), a signature management service 140 for updating the vulnerability scanners, and an inventory system 150 storing information on devices that have been scanned by the SAM 100. The SAM 100 performs a vulnerability scan on any device that is connected to a network, aggregates the results of the vulnerability scans, and post-processes the results in light of the topology of the network to determine the severity of any found vulnerabilities or abnormalities. The system may or may not alert a network administrator depending on the severity of the vulnerabilities and the abnormalities found.

The SAM 100 is configured to manage a plurality of vulnerability scanners 160-175 using the scanner manager 110. The vulnerability scanners 160-175 may include any vulnerability scanner capable of receiving a list of systems to scan and returning a list of vulnerabilities found on those systems. The vulnerability scanners 160-175 may also provide a severity rating some or all vulnerabilities identified by the vulnerability scanners 160-175. For example, the vulnerability scanners 160-175 may each include a general purpose computer with a Nessus® vulnerability scanner installed. Nessus® provides a computer with the ability to audit one or more computers on the same network for vulnerabilities, compliance specifications, policy violations, and other potential problems. Each vulnerability tested for by a scanner has an associated risk factor. The risk factors include low, medium, high, and critical and are assigned based on the potential impact posed by the vulnerability, the level of exploitability of the vulnerability, availability of any remedial measures that may be taken, as well as environmental and temporal factors. Each of the scanners 160-175 may be configured to scan different networks, subnets, or parts of networks 180-195.

The scanner manager 110 communicates instructions to each of the scanners 160-175. The instructions may identify the systems, devices, etc., to be scanned, and may identify the tests to perform on the identified systems, etc. These instructions may be pared with a SAM policy. The SAM policy includes a schedule of all of the scans that will take place. The schedule includes times, dates, and frequency for conducting each scan, a listing of the IP addresses or subnets that will be scanned, and which vulnerability scanner or scanners will be assigned to conduct the scans.

The SAM policy dictates the assignment of vulnerability scanners to networks or IP addresses for scanning. Each vulnerability scanner may be assigned by supplying each of the vulnerability scanners with a series or block IP addresses, a subnet, or domains to scan. Vulnerability scanners may be assigned according to networks that the scanners are locally connected to. For example, a first vulnerability scanner 160 may be configured to scan devices that are connected to a first network 180, a second vulnerability scanner 165 may be configured to scan devices that are connected to a second network 185, a third vulnerability scanner 170 may be configured to scan devices that are connected to a subnet 195 of a third network 190, and a fourth vulnerability scanner 175 may be configured to scan the devices that are connected to the third network 190, but are not connected to the subnet 195.

The SAM policy also includes a scanner policy for each vulnerability scanner. The scanner policy designates how the vulnerability scanners 160-175 will assess vulnerabilities by designating which vulnerabilities, exploits, and configurations the scanners will test. A scanner policy includes a list or identifier of scan parameters used by a vulnerability scanner to perform a particular vulnerability scan. The scanner policy identifies any potential exploits or vulnerabilities that the vulnerability scanner will attempt to identify through a particular scan or group of scans. For example, the scanner policy may identify ports to scan, applications to scan, and exploits to attempt at the identified ports and/or applications. The port scan will identify which ports, if any, of each scanned computing device is open or closed. Whether a device has a port open, the type of port, or whether the device has a port closed may then be used to determine which tests, if any, to run to check for other vulnerabilities. For example, a specific exploit may only work on a certain port. If the port scan determines that a device has that certain port open, then the vulnerability scanner may test for the specific exploit.

Similarly, the vulnerability scanner may test for the operating system present on a computing device and using that information conduct specified vulnerability tests. Common operating systems found on a network may, for example, include Microsoft® Windows®, Apple® OS X®, Linux™, Unix™, iOS®, Android®, or other operating systems. Each operating system may be susceptible to different types of attacks and have different exploits. The vulnerability scanner may determine the type of operating system a device is using by analyzing heuristics based on how a system responds to a variety of TCP/IP probes and comparing the results to known characteristics of operating systems. Each device may then be tested according to the operating system and configuration of the device.

The scanner policy also includes a list of plugins that are required to test for the vulnerabilities. A plugin is a program that may be added to the vulnerability scanner that is configured to test for a given flaw or exploit. Two examples of plugins may include a first plugin that tests whether an account on a device uses a default password and a second plugin configured to test for whether an installed application is the current version. For example, the vulnerability scanning software Nessus® has over 50,000 plugins for testing over 20,000 common vulnerabilities and exposures (CVEs) and over 15,000 vulnerabilities published by Bugtraq™. A user may select a vulnerability to scan and the scanner policy is updated to ensure that the scanner policy includes each plugin that is required to test for the vulnerability across multiple operating system or hardware platforms in the scanner policy. This may include downloading new plugins using the signature management system 130 and adding the plugins to the scanner policy.

A user may access the user interface 120 to set, edit, or otherwise define the SAM policy. Besides defining the SAM policy the user may also check on the current status and results of any scans, among other functions. The user interface 120 may also provide a notice when the SAM detects a high risk vulnerability that compromises a computer system. For example, if a vulnerability scan detects a vulnerability on a server that stores confidential information and the server is connected directly to the Internet, the SAM 100 may determine that a high risk situation is present and the user interface 120 may display a graphical icon and/or send an email to alert the user.

Figure 2:
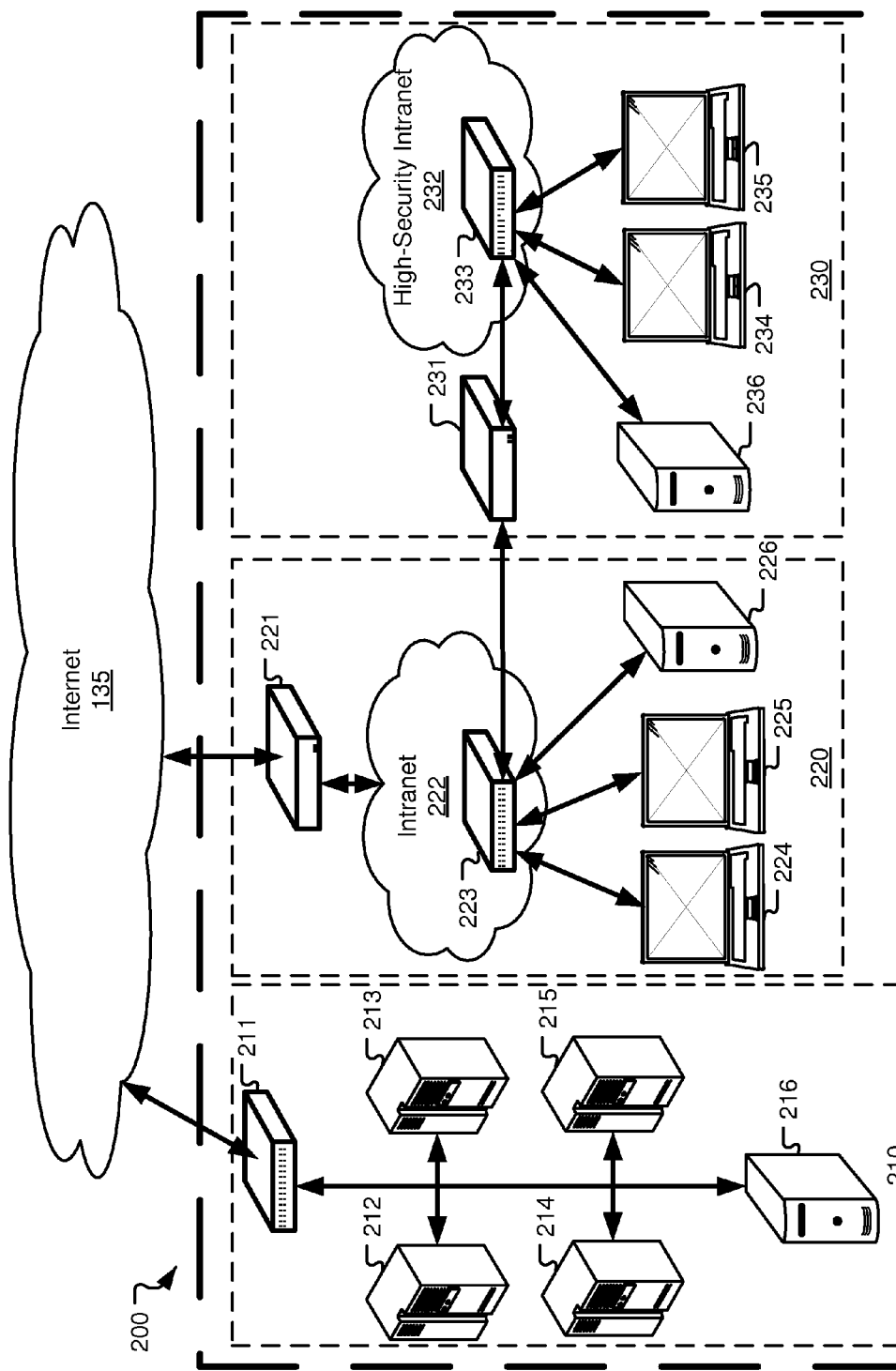
FIG. 2 depicts an example of an enterprise network with network scanners capable of scanning each portion of the enterprise network.

Referring to FIG. 2, an example enterprise network 200 is depicted. The enterprise network 200 is divided into three subnets. A first subnet 210 is connected directly to the Internet 135. The first subnet 210 may include any servers or computers 212-215 that require access to the Internet 135. For example, the first subnet 210 may include file servers, transaction processing servers, web hosting servers, or any other servers or computers that are openly connected to the Internet 135. A second subnet 220 is also connected to the Internet 135, but is located behind a first firewall 241. The second subnet 220 may operate similar to a conventional corporate intranet 222 with a variety of switches and routers 223 providing Internet access to various workstations 224, 225, and filtering undesired Internet traffic, such as banned websites and traffic on certain computer ports. The second subnet 220 may also include servers configured to provide files and services to the workstations 224, 225. The workstations 224, 225 may include any computing devices connected to the intranet 222, such as laptop computers, desktop computers, tablet computers, mobile phones, or any other electronic device. In this example, the third subnet 230 includes a higher-security intranet 232 and any networking equipment such as switches or routers 233 that provides the intranet 222 service. The third subnet 232 is behind a second firewall 231 that further limits incoming and outgoing communications of any servers or workstations 234, 235. A workstation or server located on each subnet 210, 220, 230 is configured to operate as a vulnerability scanner 216, 226, 236 for the respective subnets. The enterprise network 200 depicted is a relatively simple network used to describe the functions of the SAM, and other concepts discussed herein. Aspects of the present disclosure may, however, be used in various possible networks and are not limited to the example of FIG. 2.

Referring again to FIG. 1 and with continued reference to FIG. 2, the SAM 100 may have a SAM policy that is configured to assign IP addresses of the devices to be scanned to vulnerability scanners based on the network connectivity of a given vulnerability scanner. Vulnerability scanners that are connected outside of a firewalled network may be unable to perform an accurate vulnerability scan on a network device or devices that are inside the firewall. For example, the vulnerability scanner 216 may not be able to accurately identify vulnerabilities in the workstations 224, 225, 234, 235, due to the firewalls 221, 231. Thus the vulnerability scanner 216 would not be assigned to the IP addresses of workstations 224, 225, 234, and 235 because the firewalls 221, 231 may be configured to restrict communications from outside devices.

For example, Secure Shell (SSH) is a data communication protocol that by default communicates using TCP port 22. SSH is commonly used for data communications, remote shell services, and executing commands on a remote computer. Although SSH is a useful computing tool, only some computing devices actually need to use SSH. Moreover, SSH communications are not devoid of vulnerabilities. For example, old versions of SSH may include a vulnerability that allows a malicious remote attacker to bypass normal username/password authentication and gain root access to a system. Thus, to further secure a network, select workstations may be configured to not accept communications over port 22 and the firewalls 221, 231 may also be configured to not accept communications that are using port 22. In this case, a scanner policy may dictate that the vulnerability scanners test whether a workstation accepts communications over port 22. If the vulnerability scanner 216 located on the first subnet 210 is used, the SAM 100 would be unable to accurately determine if the workstations 224, 225, 234, 235 on the second and third subnets 220, 230 accept communications over port 22 since the firewalls 221, 231 block any communications over port 22. Thus, the SAM policy would be configured to ensure that the scanner policy was tied to scanners 226, 236 in the second and third subnets 220, 230, so those scanners can determine whether an SSH or other port 22 related vulnerability exists.

The scanner manager 110 is also configured to poll the scanners 160-175 for scan results after a scan has been initiated, upon a schedule or otherwise. The scanner manager 110 regularly requests the results from the scanners 160-175 that have been assigned IP addresses or subnets to scan. An IP address is number assigned to each individual device on a network that identifies the location each device. A subnet or subnetwork is a logical subdivision of a network. For example, network 3 (190) includes a subnet 195. Similarly, referring again to FIG. 2, the high-security intranet 232 may be considered a subnet of the intranet 222. Each device connected to network 3 (190), the subnet 195, the high-security intranet 232, or the intranet 222 is assigned an IP address. By polling the scanners 160-175 for results, the scanner manager 110 may keep track of which scans have been completed and which scans are still pending.

Due to a number of factors, some scans may take longer to complete than others. When scan times are unequal, even if work was partitioned equally at the beginning, load imbalance may occur amongst the vulnerability scanners. Thus, by using the polled information about the completed and pending scans, the scan manager 110 may perform load balancing between the scanners. Load balancing refers to the action of redistributing pending scans from one vulnerability scanner to another, if available. For example, IP addresses that were previously assigned to a particular vulnerability scanner may be reassigned to another vulnerability scanner that has a lighter load or has already completed the scans it was assigned. For example, the scan manager 110 may initially divide up subnets and blocks of IP address across multiple scanners in order to increase efficiency. Scan assignments may initially be distributed evenly across multiple vulnerability scanners (or according to speed and resources of the vulnerability scanners). For example, a more powerful computer may be capable of completing a scan in a short period of time. In another example, the vulnerability scanner may be one of several programs operating on a server. Thus, the vulnerability scanner may operate less efficiently because the vulnerability scanner is competing for processing power and/or network usage with other programs. As the vulnerability scans are being completed, the scanner manager 110 polls the vulnerability scanners for results and may redistribute IP addresses to optimally utilize the scanners.

For example, a first server operating a first vulnerability scanner may have higher performance characteristics than a second server operating a second vulnerability scanner. The SAM policy may dictate that a total of 1000 IP addresses need to be scanned by the first and second vulnerability scanners. The scan manager 110 may assign the first vulnerability scanner 700 IP addresses to scan and the remaining 300 IP addresses to the lower performance, second vulnerability scanner. The first vulnerability scanner was assigned more of the IP addresses because the second vulnerability scanner was expected to complete scans at a slower rate. As the vulnerability scans complete, the scan manager 110 may at any time redistribute the IP addresses between the scanners. For example, the second vulnerability scanner may finish scanning its allocated IP addresses before the first scanner finishes scanning its allocated IP addresses. The scan manager 110 may recognize that the second vulnerability scanner has completed its allocated IP addresses and may then reallocate some of the first vulnerability scanner's IP addresses to the second vulnerability scanner. After the vulnerability scans have been completed the results of the scans are reported.

The results include a listing of each vulnerability was found and a corresponding severity rating for the vulnerability. For example, each Nessus® plugin is directed towards testing a vulnerability and each vulnerability has a predetermined severity rating associated with the vulnerability. The severity ratings include low, medium, high, and critical. The results may also include metadata that tags the results with data related to the vulnerability scan. The metadata may include any information relevant to the scan, such as any scan parameters (e.g. the subnet scanned, the IP addresses of the devices scanned, the SAM policy that was used, the scanner policy that was used) and a timestamp. The metadata may be used later used for analyzing the results. The results with corresponding metadata may then be stored in a persistent memory accessible by the SAM 100, such as in a database in a remote server.

Referring still to FIG. 1, The SAM also includes a signature management system 130 configured to ensure that the plugins used by the vulnerability scanners to run the scanner policies are all present and up-to-date. The signature management system 130 may regularly poll outside sources available on the Internet 135 for new plugins. For example, Tenable™ publishes new Nessus® plugins for newly discovered vulnerabilities on a daily basis. The signature management system 130 may retrieve new each new or updated plugin. The signature management system 130 may then update the vulnerability scanners 160-175 with the new and/or updated plugins. In some cases, some scanners may not need the new plugins. For example, a new plugin may be directed towards a vulnerability only found in a specific version of software that may not ever be present on the various networks 180-195. The signature management system 130 may review the plugins and vulnerabilities used in the SAM policy and the corresponding scanner policies to determine which new plugins to add in order to avoid the needless installation of plugins. The signature management system 130 may also poll the vulnerability scanners 160-175 to determine the plugins in use on each scanner and then determine whether any updates are needed. Updates to the plugins as well as new or missing plugins may be downloaded from a remote server, such as the Nessus® plugin feed, connected to the Internet 135. The signature management system 130 then installs the new, missing, and/or updated plugins on the appropriate vulnerability scanners 160-175.

A data service 140 provides an application programming interface (API) for outside programs 145 to access the SAM 100. Outside programs may include programs that gather complete results or results for specific IP address or subnets. Using the API, the data service 140 allows the outside programs 145 to modify the SAM and scanner policies as well as retrieve any data collected by the SAM 100. The data collected by the SAM 100 may include providing any information on vulnerabilities that have been detected. The data service 140 allows for a properly configured outside program to have access to the SAM 100 similar to a user accessing the SAM 100 using the user interface 120.

An inventory system 150 is also included to track and identify devices that are connected to a network. The inventory system 150 may log the type of devices, the operating system the devices are using, or any other programs operating on the devices that are visible to the vulnerability scanner. The vulnerability scanners are capable of discovering devices that are connected to the network that they are scanning. For example, a vulnerability scanner may be assigned to scan a subnet or block of IP addresses. In that block of IP addresses, some IP addresses may not be assigned to any devices. When a scan is performed, the scanner may perform a simple check to determine if an IP address is in use. This may be accomplished by pinging the IP address. After it has been determined that there is a device using an IP address, the device is scanned. As each device is scanned for the first time, the inventory system 150 may update its record for the IP address to include information on the device connected at that address such as the type of device (workstation, server, mobile device), the operating system running on the device, and a list of the applications running on the device.

Figure 3:
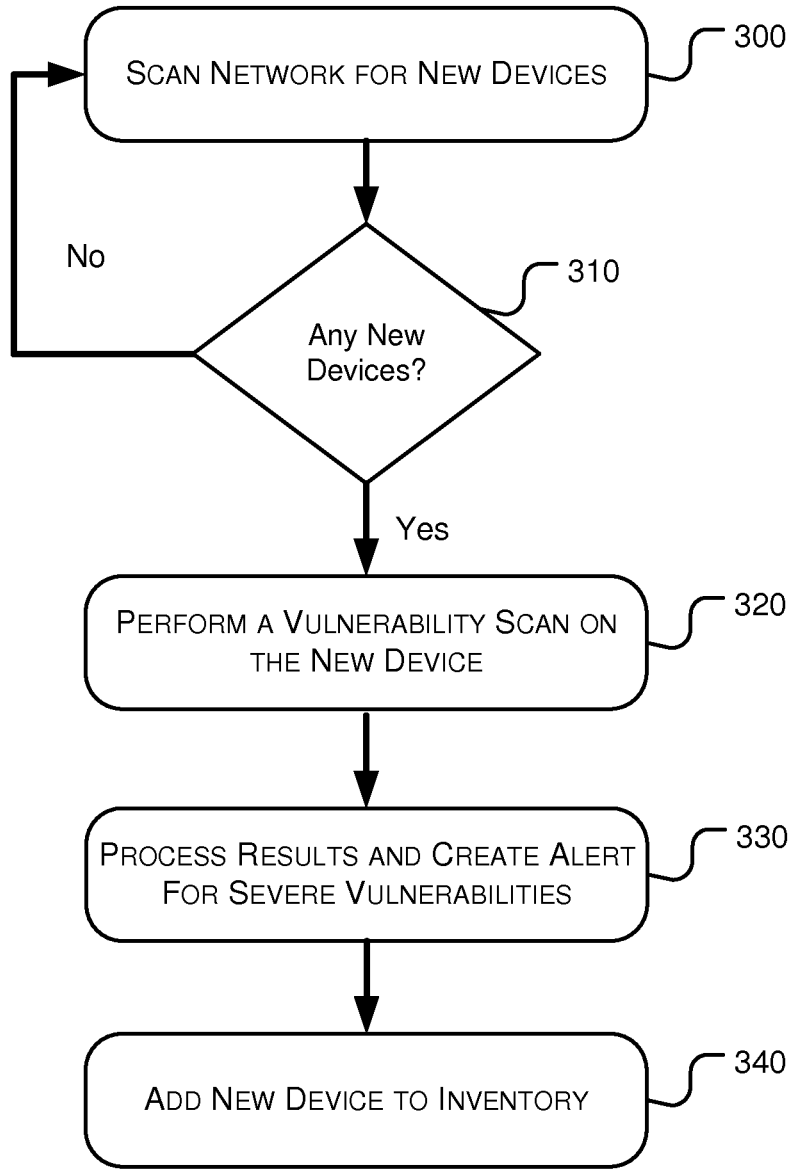
FIG. 3 depicts an example method of scanning an enterprise network for new devices and updating inventor of the devices connected to the enterprise network.

In some cases, the SAM 100 may be configured to search a network for any new devices that are added. For example, an enterprise network may be regularly scanned and well-maintained resulting in few vulnerabilities. The biggest threat to this network may be from new devices being added or temporarily connected to the network. For example, an employee may bring a personal computing device, such as a laptop, smart phone, or tablet, and may connect the device to the network. Referring to FIG. 3, a method of scanning a network for new devices is depicted. The SAM 100 may periodically scan the network for any new devices (operation 300). As stated above, this may be accomplished by keeping track of unused IP addresses and pinging those IP addresses. If a new device is discovered (operation 310), the SAM 100 may assign an appropriate vulnerability scanner to scan the newly discovered device according to the SAM policy for the subnet on which the device is connected (operation 320). Once the scan has been completed, the results of the scan are processed by the SAM and an alert may be generated if a severe vulnerability is discovered (operation 330). The results of the scan as well as the device information may also be added to the inventory of devices (operation 340).

Figure 4:
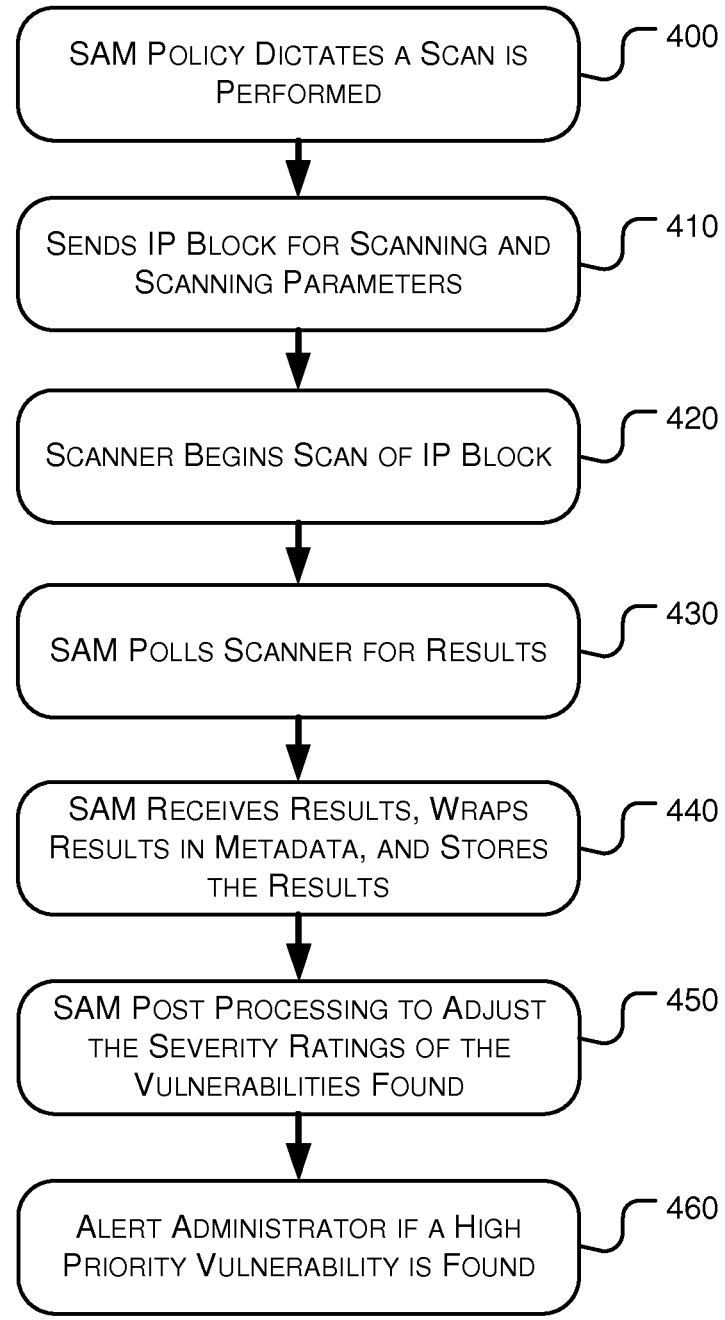
FIG. 4 depicts an example method of a security asset manager conducting a network scan and determining vulnerabilities present in a network.

Referring to FIG. 4, a method of performing a vulnerability scan using network information is depicted. A SAM policy may define a vulnerability scan to be performed on a specific block of IP addresses or subnet of a network (operation 400). The block of IP addresses may include any list of IP addresses, which may be a consecutive list of IP addresses. A subnet may include a group of IP addresses belonging to a logical subdivision of a network. The block of IP addresses or subnet are then sent to a vulnerability scanner or allocated amongst a group of vulnerability scanners (operation 410). Each of the vulnerability scanners begins scanning each assigned IP address from the block of IP addresses or subnet (operation 420). As the scans are being conducted, the SAM polls the scanners for results or the results are otherwise provided to or accessed by the SAM (operation 430). As the SAM obtains the results, the SAM adds metadata describing the parameters of the scan to the results and then stores the results in a memory accessible by the SAM (operation 440). The memory accessible by the SAM may include a database directly operated by the SAM or on a network attached storage device.

Results that have been stored may then be post-processed to adjust a severity rating of any vulnerabilities found (operation 450). As described above, each system vulnerability tested for may be associated with a severity rating by the vulnerability scanner. The vulnerability rating defines a risk associated with the vulnerability. For example, a device that is running an outdated operating system may have a severity rating that is high, while a device with an application missing a patch may have a lower severity rating. The SAM may increment or decrement the severity of a discovered vulnerability by correlating the vulnerability with information related to the device with the vulnerability and the network that the device is operating on. The adjusted severity of each discovered vulnerability may then be compared to a threshold for alerting an administrator.

For example, the SAM may use device information such as the location of the device on the network to increment, decrement, or not modify a severity rating. For example, referring again to FIG. 2, the workstations 224-225, are located on the intranet 222. A vulnerability on one of these devices could lead to problems on a company's intranet. On the other hand, the devices are located behind the firewall 221. Thus, the SAM does not modify the severity rating of the vulnerability. The severity rating of the vulnerability may also be modified according to the accessibility of the device from the Internet. For example, the workstations 234, 235 are located on a high-security intranet 232 and may have no Internet connection. Even though these devices have a vulnerability, the actual risk posed by the vulnerability is lower since the vulnerability cannot be exploited as the devices are not accessible by outside malicious parties. Thus, the SAM may, in this case, decrement the severity rating.

Another factor for adjusting the severity rating of the vulnerability is the type of information found on the device and the type of services performed by the device. For example, the server 212 may store sensitive consumer information such as credit card or social security numbers. Due to the sensitive nature of consumer information, the SAM increments the severity rating. In another example, a device may be an integral part of a network. For example, a vulnerability found on switch that routes a large amount of network data may have the severity rating incremented by the SAM.

Thus, if a vulnerability with a medium-level severity rating is found on a device that contains sensitive information such as customer billing information or personal data, then the SAM may upgrade the severity rating to a higher level severity. Furthermore, if the same device is directly connected to the Internet, the SAM may increment the vulnerability severity. In other cases, a low-importance device, such as a system with no important information and no connectivity to the Internet, with critical vulnerabilities, may have the severity rating decremented to a low severity rating to reflect the actual threat posed by the vulnerabilities. After the results have been post-processed, the SAM may alert a network administrator if a critical or high priority vulnerability is found (operation 460). The administrator is then responsible for ensuring that the vulnerabilities are properly addressed.

FIG. 5 illustrates an example general purpose computer 500 that may be useful in implementing the described technology. The example hardware and operating environment of FIG. 5 for implementing the described technology includes a computing device, such as general purpose computing device in the form of a personal computer, server, or other type of computing device. In the implementation of FIG. 5, for example, the general purpose computer 500 includes a processor 510, a cache 560, a system memory 570, 580, and a system bus 590 that operatively couples various system components including the cache 560 and the system memory 570, 580 to the processor 510. There may be only one or there may be more than one processor 510, such that the processor of general purpose computer 500 comprises a single central processing unit (CPU), or a plurality of processing units, commonly referred to as a parallel processing environment. The general purpose computer 500 may be a conventional computer, a distributed computer, or any other type of computer.

The system bus 590 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 570 and random access memory (RAM) 580. A basic input/output system (BIOS) 572, containing the basic routines that help to transfer information between elements within the general purpose computer 500 such as during start-up, is stored in ROM 570. The general purpose computer 500 further includes a hard disk drive 520 for reading from and writing to a persistent memory such as a hard disk, not shown and an optical disk drive 530 for reading from or writing to a removable optical disk such as a CD ROM, DVD, or other optical media.

The hard disk drive 520 and optical disk drive 530 are connected to the system bus 590. The drives and their associated computer-readable media provide nonvolatile storage of computer-readable instructions, data structures, program engines and other data for the general purpose computer 500. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program engines may be stored on the hard disk, optical disk, ROM 570, or RAM 580, including an operating system 582, a SAM application 584, and one or more application programs 586. A user may enter commands and information into the general purpose computer 500 through input devices such as a keyboard and pointing device connected to the USB or Serial Port 540. These and other input devices are often connected to the processor 510 through the USB or serial port interface 540 that is coupled to the system bus 590, but may be connected by other interfaces, such as a parallel port. A monitor or other type of display device may also be connected to the system bus 490 via an interface, such as a video adapter 560. In addition to the monitor, computers typically include other peripheral output devices (not shown), such as speakers and printers.

The general purpose computer 500 may operate in a networked environment using logical connections to one or more remote computers. These logical connections are achieved by a network interface 550 coupled to or a part of the general purpose computer 500; the system is not limited to a particular type of communications device. The remote computer may be another computer, a server, a router, a network PC, a client, a peer device, or other common network node, and typically includes many or all of the elements described above relative to the general purpose computer 500. The logical connections include a local-area network (LAN) a wide-area network (WAN), or any other network. Such networking environments are commonplace in office networks, enterprise-wide computer networks, intranets and the Internet, which are all types of networks.

The network adapter 550, which may be internal or external, is connected to the system bus 590. In a networked environment, programs depicted relative to the general purpose computer 500, or portions thereof, may be stored in the remote memory storage device. It is appreciated that the network connections shown are example and other means of and communications devices for establishing a communications link between the computers may be used.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

Various modifications and additions can be made to the exemplary embodiments discussed without departing from the scope of the present disclosure. For example, while the embodiments described above refer to particular features, the scope of the system also includes embodiments having different combinations of features and embodiments that do not include all of the described features. Accordingly, the scope of the present system is intended to embrace all such alternatives, modifications, and variations together with the equivalents thereof.

What is claimed is:

1. A security asset management system comprising:
a computing device including a processor coupled to a memory, the memory storing instructions for execution on the processor, the instructions configured to cause the processor to:
perform a first vulnerability scan on a first plurality of IP addresses on a first network using a first vulnerability scanner to identify a first vulnerability of a first computing device operating using one of the first plurality of IP addresses, wherein the first vulnerability is associated with a first severity rating;
perform a second vulnerability scan on a second plurality of IP addresses on a second network using a second vulnerability scanner to identify a second vulnerability of a second computing device operating using one of the second plurality of IP addresses, wherein the second vulnerability is associated with a second severity rating;
adjust the first severity rating according to at least one network configuration associated with the first network;
adjust the second severity rating according to at least one network configuration associated with the second network;
discover a new device operating at an IP address included in the first plurality of IP addresses by pinging the IP address and receiving a response;
perform a vulnerability scan on the new device; and
add the new device to a device inventory including a result from the vulnerability scan,
wherein the first vulnerability scan and the second vulnerability scan are performed according to a security asset manager policy comprising:
a scan schedule listing a date and time for scanning the first and second pluralities of IP addresses;
a first scanner policy corresponding to the at least one network configuration of the first network; and
a second scanner policy corresponding to the at least one network configuration of the second network.

2. The system of claim 1, wherein the first scanner policy and the second scanner policy each comprise at least one vulnerability test to perform and at least one plugin to perform the vulnerability test.

3. The system of claim 2, further comprising:
retrieve at least one update to an outdated plugin of the at least one plugin; and
install the at least one update on at least one of the first vulnerability scanner and second vulnerability scanner.

4. The system of claim 1, wherein the first vulnerability scanner comprises a plurality of vulnerability scanners operating on each of a plurality of computing devices and the first plurality of IP addresses are divided between the plurality of computing devices for scanning.

5. The system of claim 4, further comprising reassigning at least one IP address assigned to one of the plurality of computing devices to a different one of the plurality of computing devices according to a progress of the first vulnerability scan on each computing device.

6. The system of claim 1, wherein the at least one IP address comprises each IP address in a subnet of a network and a block of IP address in the network.

7. The system of claim 1, wherein the at least one network configuration associated with the first network comprises at least one of an accessibility of the first network from the Internet, a function of the first network, and a data stored on the first network.

8. A method of performing security asset management comprising:
obtaining, at a computing device comprising a processor coupled to a memory, a first set of results of a first vulnerability scan on a first plurality of IP addresses on a first network from a first vulnerability scanner, wherein the first set of results include a first vulnerability that is associated with a first severity rating;
obtaining, at the computing device, a second set of results of a second vulnerability scan on a second plurality of IP addresses on a second network from a second vulnerability scanner, wherein the second set of results include a second vulnerability that is associated with a second severity rating;
adjusting the first severity rating according to at least one network configuration associated with the first network using the computing device;
adjusting the second severity rating according to at least one network configuration associated with the second network using the computing device;
discovering a new device operating at an IP address included in the first plurality of IP addresses by pinging the IP address and receiving a response;
performing a vulnerability scan on the new device; and
adding the new device to a device inventory including a result from the vulnerability scan,
wherein the first vulnerability scan and the second vulnerability scan are performed according to a security asset manager policy comprising:
a scan schedule listing a date and time for scanning the first and second pluralities of IP addresses;
a first scanner policy corresponding to the at least one network configuration of the first network; and
a second scanner policy corresponding to the at least one network configuration of the second network.

9. The method of claim 8, wherein the first scanner policy and the second scanner policy each comprise at least one vulnerability test to perform and at least one plugin to perform the vulnerability test.

10. The method of claim 9, further comprising:
retrieve at least one update to an outdated plugin of the at least one plugin; and
install the at least one update on at least one of the first vulnerability scanner and second vulnerability scanner.

11. The method of claim 8, wherein the first vulnerability scanner comprises a plurality of vulnerability scanners operating on each of a plurality of computing devices and the first plurality of IP addresses are divided between the plurality of computing devices for scanning.

12. The method of claim 11, further comprising reassigning at least one IP address assigned to one of the plurality of computing devices to a different one of the plurality of computing devices according to a progress of the first vulnerability scan on each computing device.

13. The method of claim 8, wherein the at least one IP address comprises each IP address in a subnet of a network and a block of IP address in the network.

14. The system of claim 8, wherein the at least one network configuration associated with the first network comprises at least one of an accessibility of the first network from the Internet, a function of the first network, and a data stored on the first network.

15. A system for security asset manager comprising:
a computing device including a processor coupled to a memory, the memory storing instructions for execution on the processor, the instructions configured to cause the processor to:
perform a first vulnerability scan on a first plurality of IP addresses on a first network using a first plurality of vulnerability scanners to identify a first vulnerability of a first computing device operating using one of the first plurality of IP addresses, wherein the first vulnerability is associated with a first severity rating;
perform a second vulnerability scan on a second plurality of IP addresses on a second network using a second plurality of vulnerability scanners to identify a second vulnerability of a second computing device operating using one of the second plurality of IP addresses, wherein the second vulnerability is associated with a second severity rating;
adjust the first severity rating according to at least one network configuration associated with the first network;
adjust the second severity rating according to at least one network configuration associated with the second network
discover a new device operating at an IP address included in the first plurality of IP addresses by pinging the IP address and receiving a response;
perform a vulnerability scan on the new device; and
add the new device to a device inventory including a result from the vulnerability scan,
wherein the first vulnerability scan and the second vulnerability scan are performed according to a security asset manager policy comprising:
a scan schedule listing a date and time for scanning the first and second pluralities of IP addresses; and
a first scanner policy corresponding to the at least one network configuration of the first network; and
a second scanner policy corresponding to the at least one network configuration of the second network.

16. The system of claim 15, wherein the first scanner policy and the second scanner policy each comprise at least one vulnerability test to perform and at least one plugin to perform the vulnerability test.

17. The system of claim 16, further comprising:
retrieve at least one update to an outdated plugin on the list of plugins; and
install the at least one update on the vulnerability scanner.

18. The system of claim 15, further comprising reassigning at least one IP address assigned to one of the first plurality of vulnerability scanners to a different vulnerability scanner of the first plurality of vulnerability scanners according to a progress of the first vulnerability scan on each vulnerability scanner.

* * * * *